(12) United States Patent
Nishimura et al.

(10) Patent No.: US 10,065,259 B2
(45) Date of Patent: Sep. 4, 2018

(54) WELDING CONDITION DERIVATION DEVICE

(71) Applicant: Kobe Steel, Ltd., Hyogo (JP)

(72) Inventors: Toshihiko Nishimura, Kobe (JP); Masatoshi Hida, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 10 days.

(21) Appl. No.: 15/315,328

(22) PCT Filed: Jun. 4, 2015

(86) PCT No.: PCT/JP2015/066219
§ 371 (c)(1),
(2) Date: Nov. 30, 2016

(87) PCT Pub. No.: WO2015/186795
PCT Pub. Date: Dec. 10, 2015

(65) Prior Publication Data
US 2017/0209950 A1    Jul. 27, 2017

(30) Foreign Application Priority Data

Jun. 4, 2014 (JP) .................... 2014-115700

(51) Int. Cl.
*B23K 9/00* (2006.01)
*B23K 9/095* (2006.01)
(Continued)

(52) U.S. Cl.
CPC .......... *B23K 9/0953* (2013.01); *B23K 9/0203* (2013.01); *B23K 9/0216* (2013.01);
(Continued)

(58) Field of Classification Search
CPC .... B23K 9/0953; B23K 10/02; B25J 15/0019; Y10S 901/42; H05H 1/36; H05H 1/28
(Continued)

(56) References Cited

U.S. PATENT DOCUMENTS 4,445,022 A *  4/1984  Mori .................... B23K 9/0953
                                                      219/125.1
4,831,235 A *  5/1989  Kishi .................... B23K 9/127
                                                     219/125.12
(Continued)

FOREIGN PATENT DOCUMENTS

JP    H08-015665 B2    2/1996
JP    H08-197245 A     8/1996
(Continued)

OTHER PUBLICATIONS

International Search Report issued in PCT/JP2015/066219; dated Sep. 1, 2015.
Written Opinion issued in PCT/JP2015/066219; dated Sep. 1, 2015.

*Primary Examiner* — Mark Paschall
(74) *Attorney, Agent, or Firm* — Studebaker & Brackett PC (57) ABSTRACT

A welding parameter derivation device of a welding machine having a torch and a weaving mechanism derives welding parameters in accordance with the cross-sectional shape of a weld portion of a new base metal. A database stores welding parameter data, and a welding parameter computation unit computes welding parameters for the shape of a groove or joint of a new base metal. Based on past welding parameter data for a shape similar to that of a groove or joint of a new base metal, and input data pertaining to the specifications of the welding machine, the computation unit derives welding parameter data for the new base metal, taking into account a parameter of the cross-sectional area of the weld portion formed on the new base metal, the bead height of the weld portion, the quantity of heat inputted to the new base metal, and a torch weaving parameter.

19 Claims, 4 Drawing Sheets

WELDING CONDITIONS FOR PAST BASE METAL (51) Int. Cl.
*B25J 15/00* (2006.01)
*B23K 9/02* (2006.01)
*B23K 9/127* (2006.01)
*B23K 9/173* (2006.01)

(52) U.S. Cl.
CPC .............. *B23K 9/127* (2013.01); *B23K 9/173* (2013.01); *B25J 15/0019* (2013.01); *G05B 2219/45104* (2013.01); *Y10S 901/42* (2013.01)

(58) Field of Classification Search
USPC ... 219/125.1, 125.12, 121.45, 121.54, 137 R
See application file for complete search history.

(56) References Cited

U.S. PATENT DOCUMENTS

| | | | |
|---|---|---|---|
| 6,693,259 B2* | 2/2004 | Moon | B23K 9/127 |
| | | | 219/124.34 |
| 7,388,171 B2* | 6/2008 | Morimoto | B23K 9/32 |
| | | | 219/108 |
| 2003/0075534 A1* | 4/2003 | Okamoto | B23K 9/095 |
| | | | 219/125.1 |
| 2013/0026148 A1 | 1/2013 | Aoyama et al. | |
| 2017/0113292 A1* | 4/2017 | Nishimura | B23K 9/0953 |

FOREIGN PATENT DOCUMENTS

| | | |
|---|---|---|
| JP | 2806733 B2 | 9/1998 |
| JP | 2000-033477 A | 2/2000 |
| JP | 2004-017088 A | 1/2004 |
| JP | 4242111 B2 | 3/2009 |
| WO | 2011/102142 A1 | 8/2011 |

\* cited by examiner

PAST BASE METAL

FIG. 3B

NEW BASE METAL

FIG. 4A

WELDING CONDITIONS FOR PAST BASE METAL

FIG. 4B

WELDING CONDITIONS FOR NEW BASE METAL

WELDING CONDITION DERIVATION DEVICE

TECHNICAL FIELD

The present invention relates to a welding condition derivation device that derives welding conditions for welding.

BACKGROUND ART

Arc welding is widely used when ships, structures and buildings such as bridges, automobiles, etc., are manufactured. In particular, in arc welding for a middle thick plate, "multi-layer overlay welding" of building up a plurality of welding beads on an object joint is used. The "multi-layer overlay welding" indicates welding to stack a layer of weld metal formed by at least one pass as defined in JIS (JIS Z 3001). A single welding operation executed along the weld joint is called pass. Also, a weld layer formed by executing the pass a plurality of times is defined as bead.

To execute the above-described multi-layer overlay welding, it is required to obtain welding conditions including the following items for each pass.
(1) Position and posture of torch: target position, target angle, advance/retract angles, etc., with respect to groove
(2) Welding output value: welding current, wire feed speed, welding voltage, etc.
(3) Torch moving method: welding speed, weaving pattern, etc.

Also, to obtain good welding quality for an object workpiece, it is required to compute proper welding conditions (1) to (3) by repeatedly executing an actual welding test in advance with use of test pieces.

Proper procedure conditions differ from one another in accordance with an object to be welded (for example, joint type (V-type, single bevel-type, T-type, etc.), plate thickness, groove angle, material of object workpiece, etc.) and a welding related device (for example, characteristics of welding power source, type of shielding gas, material, diameter, protruding length from torch tip of welding wire, etc.). Hence, the aforementioned actual welding test is required to be executed for each object to be welded and each welding device.

Also, in recent years, the welding conditions are converted into numerical values as a welding step is robotized and automated, and the numerical welding conditions are stored in a database or the like so that the numerical welding conditions can be re-used in another welding step.

However, currently, only a specific welding technician can properly derive welding conditions. Also, to obtain proper welding conditions for each object to be welded and each welding related device, it is required to execute an enormous number of actual welding tests. This is actually impossible. PTL 1 to PTL 3 disclose technologies for solving the above-described problems.

PTL 1 discloses automatic welding equipment that controls the welding speed of a welding torch unit and welds a groove part having a predetermined weld length. This automatic welding equipment includes computing means for dividing the weld length into a plurality of sections, computing the cross-sectional area of each weld layer in each section on the basis of the groove bottom surface width of the groove part, groove angle, and height of the groove part at each of a welding start portion and a welding end portion, and further computing the welding speed of the welding torch unit for each weld layer in each section in accordance with this cross-sectional area; storage means for storing information computed by the computing means; and speed control means for reading the information for each weld layer in each section from the storage means and controlling the welding speed of the welding torch unit.

That is, PTL 1 is a technology for an object to be welded being a steel-frame member for construction. The technology divides a weld cross section into respective passes, on the basis of the height, bottom surface width, and groove angle of the steel-frame member, and computes the welding speed in accordance with the deposition cross-sectional area of each pass. Also, even if the groove angle is different due to a processing error of the steel-frame member being the object workpiece, PTL 1 executes welding while setting the thickness of the weld layer to be constant by automatically adjusting the existing conditions.

PTL 2 discloses a method of executing multi-layer overlay welding for a fillet weld joint by using automatic welding equipment capable of arc welding for any joint shape by using predetermined teach data. In this method, an arithmetic processing unit that executes control on the automatic welding equipment and automatic arithmetic processing for a multi-layer overlay welding pass plan. At the automatic arithmetic operation for the multi-layer overlay welding pass plan by this arithmetic processing unit, at least the weld joint shape, welding leg length to be filled with predetermined deposition metal, gap of a joint part, and equivalent welding current, and shift amount of a welding torch from a first layer to a last layer are input as initial conditions. On the basis of this input values, the welding voltage, wire melting speed, total cross-sectional area for deposition and number of weld layers required for filling the welding leg length, number of welding passes from the first layer to the last layer, welding speed, deposition cross-sectional area per pass, bead height and width of welding in the first layer, total bead height and width obtained by built-up welding, etc., are arithmetically operated. The pass coordinates for each welding pass and the position coordinates of the welding torch from the first layer to the last layer are arithmetically operated on the basis of the arithmetic operation result, and the series of arithmetic operation results is displayed. In addition, pass plan data is created which is constituted of the optimum welding condition, the pass coordinates, and the position coordinates of the welding torch for each welding pass from the first layer to the last layer required for multi-layer overlay welding by the automatic arithmetic operation. Also, as teach data required for the fillet weld joint to be welded by multi-layer overlay welding, the welding line and the position of the welding torch for the first layer are input as initial conditions to the automatic welding equipment, and then transmitted to the arithmetic processing unit. With the teach data and the created pass plan data, teach pass plan data that determines and teaches the optimum welding line and position coordinates of the welding torch, and the optimum welding conditions for each pass from the first layer to the last layer is automatically created by the arithmetic processing unit, and then transmitted to the automatic welding equipment. Each welding pass from the first layer to the last layer is subsequently executed on the basis of this teach pass plan data.

That is, PTL 2 is a technology based on a preposition that the "equivalent welding current" is supplied in each pass for the shape, leg length, and gap length of the fillet weld joint to be welded, and the technology is for calculating welding conditions, such as the target position coordinates of the welding torch, number of passes, and welding voltage for each pass from the first layer to the last layer based on the preposition.

PTL 3 discloses a welding method in automatic welding equipment provided with a plurality of welding robots capable of simultaneous welding at a plurality of weld parts. When welding conditions are determined in accordance with the cross-sectional shape of each weld part, in a case where the welding conditions relate to the welding speed and welding current and each weld part includes a corner portion, this welding method determines the welding speed in accordance with the radial position of turning of a welding tool at the corner portion of each weld part, determines the welding speed at a straight portion before each corner portion so that start operations of turning are synchronously executed at the corner portions of the respective weld parts, and determines the welding current in accordance with the welding speed.

That is, PTL 3 is a technology that divides the total cross-sectional area of the weld part by a preset reference cross-sectional area and obtains the number of welding passes. For example, it is assumed that the reference cross-sectional area is "a cross-sectional area that can be welded by a single pass." If a groove wider than the reference groove is used, the number of passes is automatically increased.

As described above, with the technologies from PTL 1 to PTL 3, the deposition cross-sectional area is calculated for each pass in advance, and part of the existing welding conditions is changed on the basis of each deposition cross-sectional area. Even if the shape of a joint or the like to be welded is different, new welding conditions can be automatically calculated.

CITATION LIST

Patent Literature

PTL 1: Japanese Examined Patent Application Publication No. 8-15665
PTL 2: Japanese Patent No. 2806733
PTL 3: Japanese Patent No. 4242111

SUMMARY OF INVENTION

Technical Problem

However, in the above-described technologies in PTL 1 to PTL 3, the welding conditions are derived without taking into account the following items (1) to (3).

(1) An "input heat quantity" to a base metal, which largely affects the welding quality, is not taken into account.

In the technologies in PTL 1 to PTL 3, the welding condition to be mainly operated is the "welding speed," and the welding speed v is adjusted (increased or decreased) to cause the deposition cross-sectional area of each pass to meet the predetermined target value. However, an input heat quantity Q to the base metal, which is one of items required for ensuring "penetration," being the most important for the welding quality, is not taken into account.

To be specific, the input heat quantity Q [J/cm] is computed from Expression (1) as follows.

[Math 1]

$$Q = 60 \cdot E \cdot \frac{I}{v} \quad (1)$$

In this Expression (1), v is a welding speed [cm/min], E is a welding voltage [V], and I is a welding current [A].

The input heat quantity Q when the welding voltage E and the welding current I are constant and the welding speed v is high is insufficient, and "penetration" may be incomplete. Hence, a defect, such as incomplete fusion and a crack, may be generated, and the welding quality of the base metal may be degraded.

In contrast, the input heat quantity Q when the welding voltage E and the welding current I are constant and the welding speed v is low is excessive, and mechanical characteristics, such as tensile strength and impact resistance, may be degraded.

Therefore, the inventors of this application figured out that it is required to take into account the input heat quantity Q to fall within a predetermined range when the welding speed v is computed and changed in order to ensure "penetration" for insuring the welding quality being the most important as a product.

(2) Weaving conditions of the torch are not taken into account.

In the technologies in PTL 1 to PTL 3, a computation method and an adjustment method for "weaving conditions" of the torch required as the welding conditions when a middle thick plate is welded are not explicitly disclosed.

If a base metal to be welded has a different groove shape, it is required to change and adjust not only the weaving amplitude W but also the weaving frequency F corresponding to the welding speed v. For example, if a base metal has a groove having a smaller width than the groove of a base metal welded in the past, in order to correctly obtain the target positions of the wire at both ends of the small-width groove, the weaving amplitude W is required to be decreased in accordance with the small groove width.

Further, if the welding speed v is increased to keep the deposition cross-sectional area, the weaving frequency F is required to be adjusted. In general, as the welding speed v is higher, the weaving frequency F is required to be higher. Also, to prevent welding defects, such as undercut and incomplete penetration, and to obtain good bead appearance, it is required to adjust the weaving pitch dL (=distance advanced by one-cycle weaving, i.e., wavelength of weaving wave), which is determined in accordance with the welding speed v and the weaving frequency F, to fall within a proper range.

Also, to ensure penetration, it is required to take into account weaving conditions, such as the weaving amplitude W, wire orientation (arc hitting method), and in particular, target position+torch angle (=arc direction) in weaving.

Therefore, the inventors of this application figured out that it is required to take into account the weaving conditions to adjust the weaving frequency F and to set the weaving amplitude W within the predetermined range in order to derive the welding conditions for each of various groove shapes.

(3) A bead height (bead thickness) of each pass is not taken into account. In qualitative terms, if the height of the deposition cross section of each pass (bead height d) becomes a predetermined value or larger (large bead height), the molten pool of the deposition part becomes excessive, the arc becomes unstable, and the arc no longer directly reaches the base metal. As the result, the input heat quantity may become insufficient. That is, the excessive molten pool (deposited amount) results in "leading phenomenon of molten pool" and "incomplete penetration."

The technologies in PTL 1 to PTL 3 do not explicitly disclose a method of dissolving the insufficiency of the input heat quantity, that is, a method of setting the bead height d to be the predetermined value or smaller. In particular, PTL 3 discloses that the number of passes is increased if the groove width is large. However, when the number of passes is increased, the deposition cross section height (bead height d) is increased (see FIG. 4 of PTL 3), and hence the welding condition which degrades the welding quality may be possibly computed.

Therefore, the inventors of this application verified base metals judged as "good" for the welding quality by a skilled welding technician in multiple actual welding tests, found that the major part of the base metals has a "height of deposition cross section of each pass (=bead height d)" being the predetermined value or smaller, and figured out that the bead thickness d is one of the most important parameters in terms of welding quality.

If arc welding is executed by using welding conditions derived without taking into account that the bead thickness d falls within a proper range, "penetration" may be defective, and the molten pool may be excessive. As the result, a defect, such as incomplete fusion and a crack, may be generated, and the welding quality of the base metal may be degraded.

The present invention is made in light of the above-described problems, and an object of the present invention is to provide a welding condition derivation device that can automatically derive welding conditions for arc welding by taking into account the input heat quantity, weaving motion pattern, bead thickness d, etc., which affect the welding quality, in addition to information relating to the shape of a groove of a base metal or the shape of a joint.

Solution to Problem

To attain the object, the following technical means is provided in the present invention.

A welding condition derivation device according to the present invention is provided to a welding machine that automatically executes arc welding by using a torch having a weaving mechanism, and configured to automatically derive a welding condition corresponding to a cross-sectional shape of a deposition part of a new base metal to be welded. The welding condition derivation device includes:

a database that stores welding condition data; and a welding condition computation unit that computes a welding condition in accordance with a shape of a groove of the new base metal or a shape of a joint, wherein the welding condition computation unit, on the basis of welding condition data of a past base metal similar to the shape of the groove of the new base metal or the shape of the joint, and input data relating to specifications of the welding machine, derives welding condition data of the new base metal by taking into account a parameter of a cross-sectional area of the deposition part formed at the new base metal, and at least one of parameters including a bead height of the deposition part formed at the new base metal, an input heat quantity to the new base metal, and a weaving condition of the torch.

Preferably, the welding condition computation unit may set the bead height of the new base metal within a range between a predetermined upper limit value and a predetermined lower limit value.

Preferably, the welding condition computation unit may set the input heat quantity to the new base metal within a range between a predetermined upper limit value and a predetermined lower limit value.

Preferably, the welding condition computation unit may set a weaving amplitude for the new base metal and a weaving pitch being a wavelength of a weaving wave, each serving as the weaving condition, to be respectively within ranges between predetermined upper limit values and predetermined lower limit values.

Preferably, the welding condition computation unit may extract a bead height of the past base metal from the welding condition data of the past base metal, set the extracted bead height of the past base metal as a bead height of the new base metal, then compute a cross-sectional area of a deposition part of the past base metal, and derive a welding speed serving as one piece of the welding condition data of the new base metal by using the computed cross-sectional area of the deposition part of the past base metal.

Preferably, the welding condition computation unit may compute an input heat quantity to the new base metal by using the derived welding speed, and derive a welding current serving as one piece of the welding condition data of the new base metal by using the computed input heat quantity to the past base metal.

Preferably, the welding condition computation unit may extract a weaving amplitude for the past base metal and a bead width at the past base metal from the welding condition data of the past base metal, and add a difference between the bead width at the past base metal and a bead width at the new base metal to the weaving amplitude for the past base metal and set the result as a weaving amplitude serving as one piece of the welding condition data of the new base metal.

Preferably, the welding condition computation unit may derive a weaving pitch serving as one piece of the welding condition data of the new base metal by adjusting a weaving frequency to fall within a range between a predetermined upper limit value and a predetermined lower limit value of the weaving pitch on the basis of the computed welding speed.

Preferably, the welding condition computation unit may re-calculate the upper limit value and the lower limit value of each piece of the set welding condition data of the new base metal by using the input data relating to the specifications of the welding machine.

Advantageous Effects of Invention

With the welding condition derivation device according to the present invention, the welding conditions for arc welding to attain good welding quality can be automatically derived by taking into account the input heat quantity, weaving motion pattern, and bead thickness d in addition to the information relating to the shape of the groove of the base metal or the shape of the joint. Also, the derived welding conditions can be displayed on a display or the like, and can provide detailed instruction and suggestion to an operator on the basis of the weld conditions.

DESCRIPTION OF EMBODIMENTS

A welding condition derivation device according to the present invention is described below in detail with reference to the drawings. In the following description, the same reference sign is applied to the same components. The names and functions of the components are also the same. Hence, the detailed description on these components are not repeated. First, before a welding condition derivation device 1 of the present invention is described, an overview of a vertical articulated welding robot system 4 provided with the welding condition derivation device 1 is described with reference to FIGS. 1A and 1B.

Figure 1A:
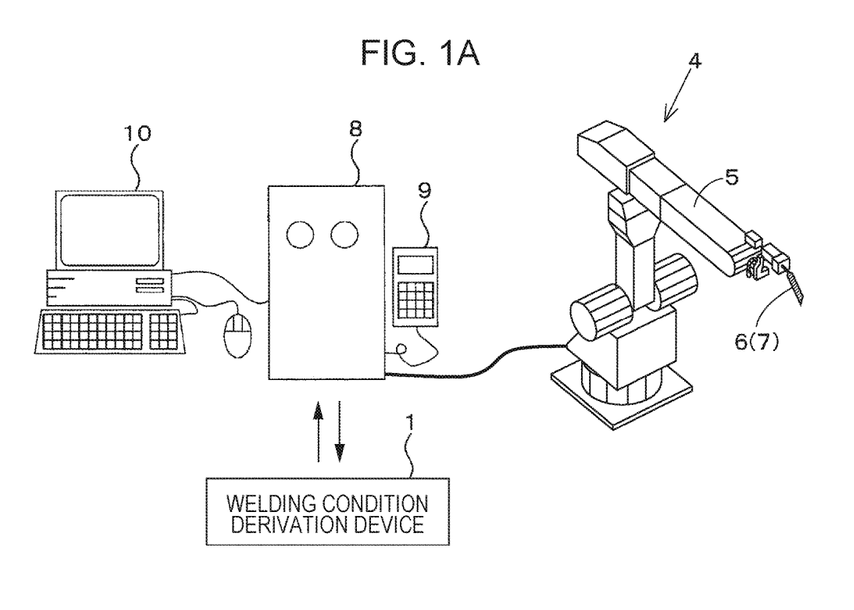
FIG. 1A is a general configuration diagram showing a welding robot system provided with a welding condition derivation device of the present invention.
Figure 1B:
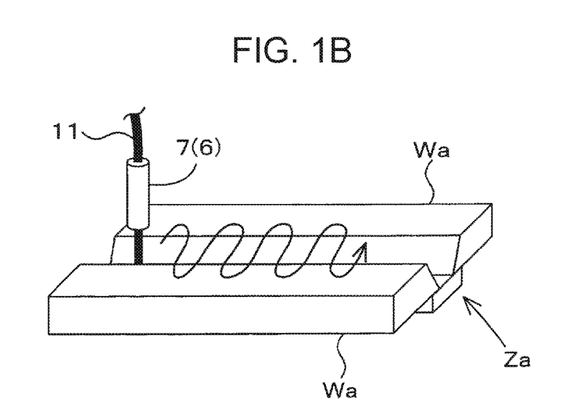
FIG. 1B is an explanatory view schematically showing an operation of a weaving mechanism provided at a torch.

FIG. 1A is a general configuration diagram showing the welding robot system 4 provided with the welding condition derivation device 1 of the present invention. FIG. 1B is an explanatory view schematically showing an operation of a weaving mechanism provided at a welding torch 7.

As shown in FIG. 1A, this welding robot system 4 includes a welding robot 5, a control device 8 including a teaching pendant 9, and a personal computer 10.

In addition, the welding robot system 4 in this embodiment is provided with the welding condition derivation device 1 (the details will be described later).

The welding robot 5 is a vertical articulated industrial robot having a plurality of axes (for example, six axes). A welding tool configured of a welding head 6 provided with the welding torch 7 (hereinafter, occasionally merely referred to as torch), and so forth, is provided at the tip end of the welding robot 5. In addition, although not shown, the welding robot 5 includes a welding power source device that supplies power, and a wire feed device that feeds a welding wire 11 (welding electrode) to the torch 7. It is to be noted that this welding robot 5 may be mounted on a slider (not shown) that moves the welding robot 5.

As shown in FIG. 1B, this welding robot 5 includes a weaving mechanism that operates the tip end (nozzle) of the torch 7 at a constant welding speed along a welding direction, and swings the torch 7 substantially perpendicularly to the welding direction.

For the shape of a groove of a base metal Wa or the shape of a joint in this embodiment, various shapes are expected. In this case, as exemplarily shown in FIGS. 3A and 3B, a groove Za of left-right symmetrical V-type (left and right facing surfaces are inclined at the same angle) is described as an example.

The shapes of grooves Za of base metals Wa include, for example, a left-right asymmetrical single bevel-type (one of facing surfaces is an inclined surface and the other is a vertical surface: single bevel groove), a left-right asymmetrical J-type (one of facing surfaces is a curved surface and the other is a vertical surface), a left-right symmetrical I-type (facing left and right surfaces are both vertical surfaces), a left-right symmetrical U-type (facing left and right surfaces are both curved surfaces), and a T-type (fillet weld welding) in which two or more base metals Wa are perpendicularly joined. This embodiment may be applied to any type of groove Za.

When arc welding is executed on a base metal (object workpiece) by using the torch 7 with the weaving motion, the control device 8 controls the welding robot 5 according to a welding condition (program), which are taught in advance, such as the adjusted position of the torch 7 (hereinafter, referred to as target position of the torch 7) and groove shapes Za and Zb of base metals Wa and Wb.

The welding condition may be set, for example, by using the teaching pendant 9 connected with the control device 8 or by using the personal computer 10. In any case, this welding condition is set in advance before arc welding is actually executed.

The welding condition set as described above is passed to the control device 8 via a storage medium etc., or transferred to the control device 8 by data communication.

Meanwhile, a command of automatic welding is given to a new base metal Wa to be newly welded on the basis of the welding condition; however, if the groove shape Za of this new base metal Wa is the same as the groove shape Zb of a past base metal Wb having a welded record in the past, the same welding condition may be extracted from data of the welding condition stored in advance in a database 2 or the like provided to the welding robot system 4, and the command of automatic welding based on the same welding condition may be given.

However, in actual welding, the groove shape Za of the base metal Wa to be newly welded by arc welding may not be the similar groove shape Zb of the past base metal Wb having a welded record in the past (including the material of the past base metal Wb).

When arc welding is executed on the new base metal Wa having the groove shape Za without a record in the past, the welding condition of the new base metal Wa is required to be calculated and derived on the basis of the extracted welding condition of the past base metal Wb similar to the groove shape Za of the new base metal Wa.

Hence, the inventors of this application have developed the welding condition derivation device 1 of the welding robot system 4 that can automatically derive the welding condition of the new base metal Wa by taking into account information relating to the deposition part formed at the new base metal Wa and information relating to the torch 7 in addition to the welding condition of the past base metal Wb similar to the groove shape Za of the new base metal Wa and information relating to the groove shape Za of the new base metal Wa. The welding condition derivation device 1 is provided to the above-described welding robot system 4, and automatically derives the welding condition corresponding to the cross-sectional shape of the new base metal Wa to be welded.

Figure 2:
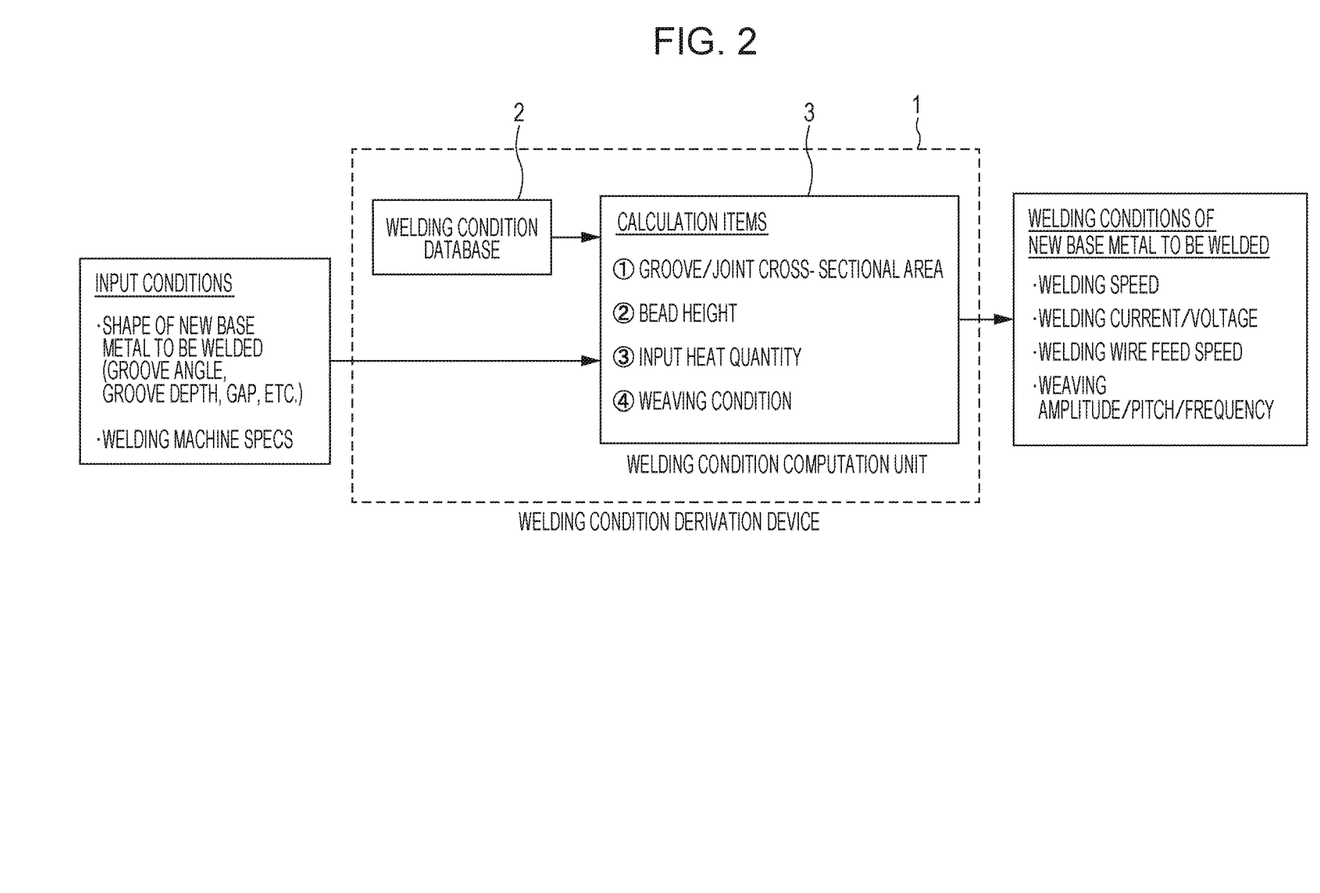
FIG. 2 is a block diagram showing a configuration of the welding condition derivation device of the present invention.

FIG. 2 is a block diagram showing a configuration of the welding condition derivation device 1 of the present invention. As shown in FIG. 2, the welding condition derivation device 1 includes the database 2 storing "welding condition data," and a welding condition computation unit 3 that computes a welding condition for the new base metal Wa.

The "welding condition data" stored in the database 2 includes a welding condition of a past base metal Wb with a welded record in the past (welding condition of past base metal Wb), a welding condition obtained from a physical model created on the basis of the past base metal Wb, and a welding condition having a derived record in the past (a welding condition actually employed, a welding condition suitable but not employed for certain reasons).

The welding condition computation unit 3 being a feature of the present invention derives "welding condition data" of the new base metal Wa by taking into account the cross-sectional area S of the deposition part formed at the new base metal Wa, and further by taking into account at least one of the bead height d of the deposition part formed at the new base metal Wa, the input heat quantity Q to the new base metal Wa, and the weaving condition of the torch 7, on the basis of "welding condition data" of the past base metal Wb similar to the new base metal Wa extracted from the database 2 and "input data" relating to the specifications of the welding robot 5.

The welding condition computation unit 3 in this embodiment derives "welding condition data" of the new base metal Wa by taking into account a parameter of a cross-sectional area $S_{pn}$ of the deposition part to the new base metal Wa, and a bead height $d_{pn}$ of the deposition part formed at the new base metal Wa, and then by taking into account an input heat quantity $Q_{pn}$ to the new base metal Wa, and the weaving condition of the torch 7, on the basis of the "welding condition data" of the past base metal Wb similar to the new base metal Wa extracted from the database 2, and the "input data" relating to the specifications of the welding robot 5.

The "input data" is data set on the basis of the specifications of the welding robot 5, and is, for example, a welding voltage E, a welding current I, a feed speed $V_W(I)$ of the welding wire 11, a radius R of the welding wire 11, and a weaving frequency F.

More specifically, to take into account the bead height $d_{pn}$ of the new base metal Wa, the welding condition computation unit 3 extracts a bead height $d_n$ of the past base metal Wb from the "welding condition data" of the past base metal Wb, and sets the extracted bead height $d_n$ of the past base metal Wb as the bead height $d_{pn}$ of the new base metal Wa. Then, the welding condition computation unit 3 computes a cross-sectional area (groove cross-sectional area) $S_n$ of the deposition part of the past base metal Wb, and derives a welding speed $v_{p1}$ being one piece of the "welding condition data" of the new base metal Wa by using the computed cross-sectional area $S_n$ of the deposition part of the past base metal Wb.

Also, to take into account an input heat quantity $Q_{p1}$ to the new base metal Wa, the welding condition computation unit 3 computes the input heat quantity $Q_{p1}$ to the new base metal Wa by using the derived welding speed $v_{p1}$. Then, the welding condition computation unit 3 derives a welding current $I_{p1}$ being one piece of the "welding condition data" of the new base metal Wa by using a computed input heat quantity $Q_1$ to the past base metal Wb.

Further, to take into account a weaving amplitude $W_{p1}$ for the new base metal Wa, the welding condition computation unit 3 extracts a weaving amplitude $W_1$ for the past base metal Wb and a bead width (leg length) $A_1$ at the past base metal Wb from the "welding condition data" of the past base metal Wb. Then, the welding condition computation unit 3 adds a difference (an increment of a bead width $A_{p1}$) $\Delta W$ between the bead width $A_1$ at the past base metal Wb and the bead width $A_{p1}$ of the new base metal Wa to a weaving amplitude $W_1$ for the past base metal Wb, and sets the result as the weaving amplitude $W_{p1}$ being one piece of the "welding condition data" of the new base metal Wa ($W_{p1}=W_1+\Delta W$).

Also, to take into account a weaving pitch (=distance between weaving end points) $dL_{p1}$ for the new base metal Wa, the welding condition computation unit 3 adjusts a weaving frequency $F_{p1}$ to fall within a range between an upper limit value and a lower limit value of the weaving pitch $dL_{p1}[P_n \pm \Delta P(n=1)]$, on the basis of the computed welding speed $v_{p1}$, and derives the weaving pitch $dL_{p1}$ being one piece of the "welding condition data" of the new base metal Wa.

In short, the welding condition computation unit 3 computes the cross-sectional area $S_{pn}$ of the deposition part from the welding speed v and the wire feed speed V of the input conditions, and computes the bead height $d_{pn}$ and the input heat quantity $Q_{pn}$ by using the computed cross-sectional area $S_{pn}$.

Then, the welding condition computation unit 3 adjusts the bead height $d_{pn}$ to fall within a range of $(d_n \pm \Delta d)$ and adjusts the input heat quantity $Q_{pn}$ to fall within a range of $(Q_n \pm \Delta Q)$, so that the computed bead height $d_{pn}$ and input heat quantity $Q_{pn}$ for each pass are not largely changed from the bead height $d_n$ and input heat quantity $Q_n$ of the welding conditions of the past base metal Wb).

Then, the welding condition computation unit 3 derives a new welding speed $v_{pn}$ by using the adjusted bead height $d_{pn}$, and derives a new wire feed speed $V_{pn}$ (=welding current $I_{pn}$) by using the adjusted input heat quantity $Q_{pn}$.

The above-described welding condition computation unit 3 may be configured to re-calculate the upper and lower limit values of each set "welding condition data" of the new base metal Wa by using the "input data" relating to the specifications of the welding robot 5.

Next, a method of deriving a welding condition of the new base metal Wa, that is, an operation of the welding condition computation unit 3 being the feature of the present invention (a derivation process of the welding condition) using the welding condition derivation device 1 of the present invention is described in detail with reference to "multi-layer overlay welding" of a V-type groove Za as an example.

Figure 3A:
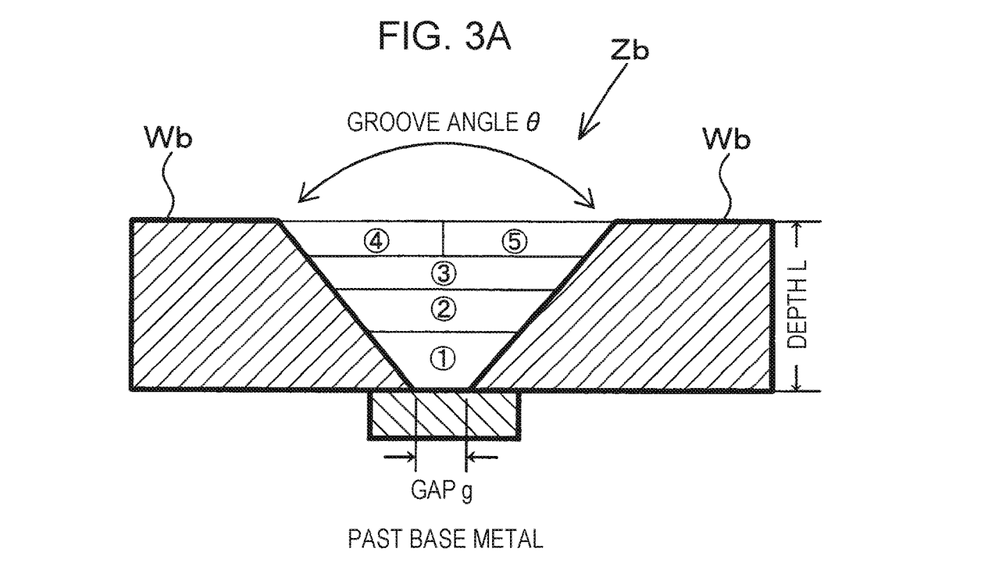
FIG. 3A is a cross-sectional view schematically showing a groove of a past base metal.
Figure 3B:
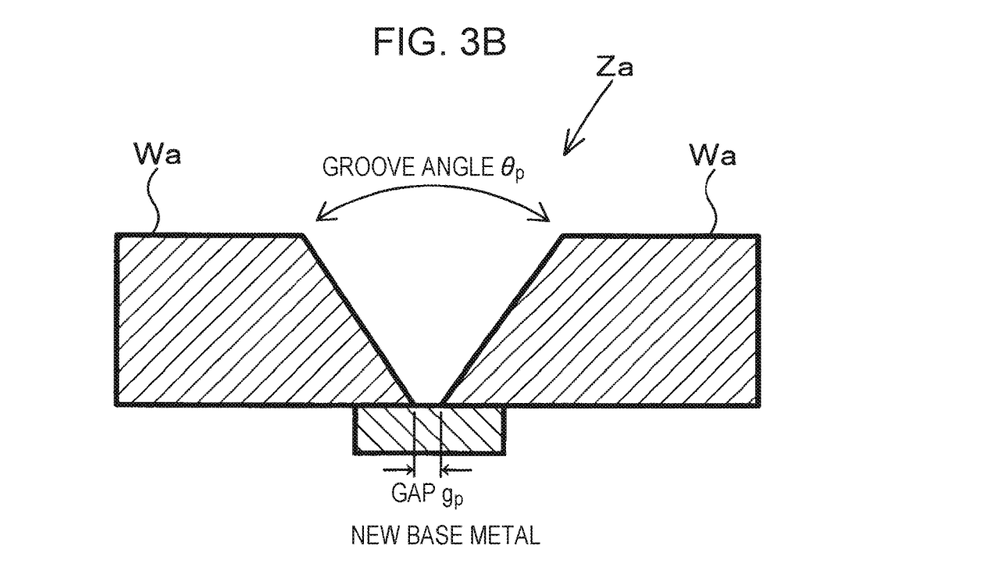
FIG. 3B is a cross-sectional view schematically showing a groove of a new base metal.
Figure 4A:
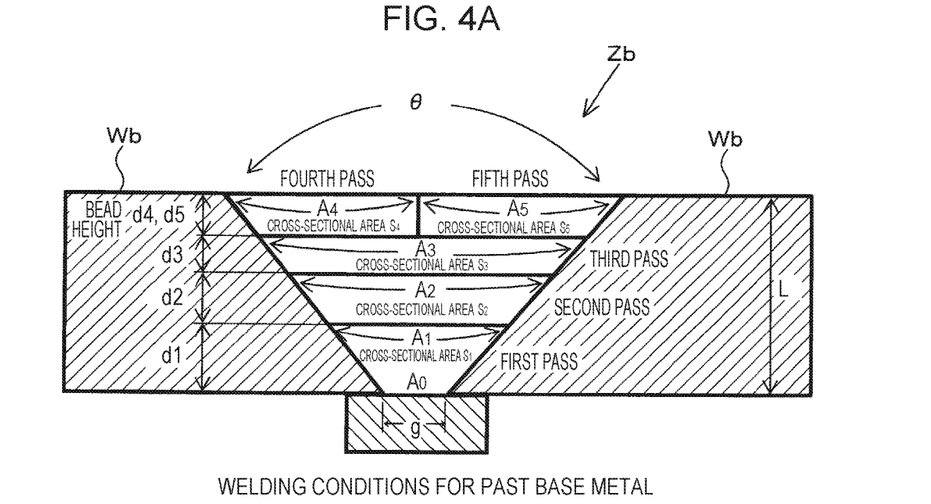
FIG. 4A is an explanatory view showing a method of computing a cross-sectional area of a deposition part formed at the groove of the past base metal.
Figure 4B:
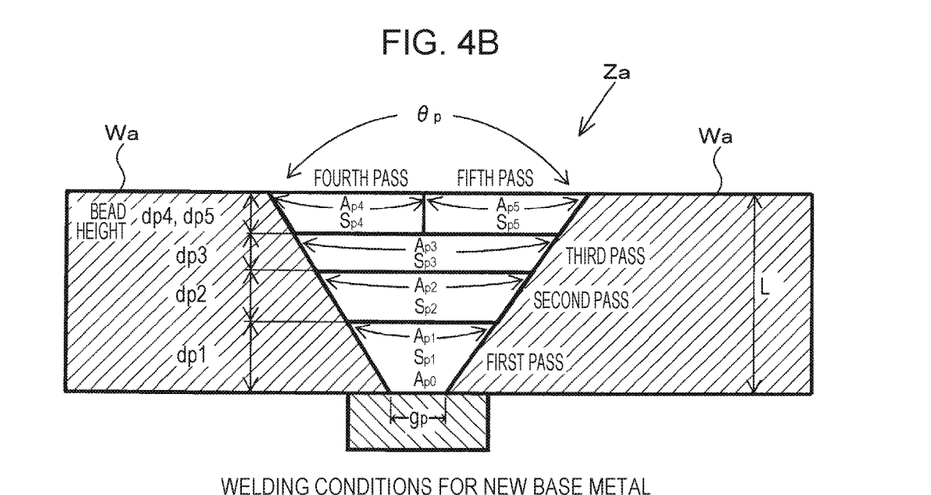
FIG. 4B is an explanatory view showing a method of computing a cross-sectional area of a deposition part formed at the groove of the new base metal.

FIG. 3A is a cross-sectional view schematically showing the groove Zb of the past base metal Wb. FIG. 3B is a cross-sectional view schematically showing the groove Za of the new base metal Wa. Also, FIG. 4A is an explanatory view showing a method of computing the cross-sectional area of a deposition part formed at the groove Zb of the past base metal Wb. FIG. 4B is an explanatory view showing a method of computing the cross-sectional area of a deposition part formed at the groove Za of the new base metal Wa.

As shown in FIGS. 3A and 3B, in this embodiment, it is assumed that an object to be newly welded by arc welding is the new base metal Wa having the V-type groove Za. Also, it is assumed that the past base metal Wb has a groove angle θ, and a gap width g. In contrast, it is assumed that the new base metal Wa has a groove angle $θ_p$, and a gap width $g_p$. It is to be noted that the groove angle satisfies ($θ > σ_p$) and the gap width satisfies ($g > g_p$). That is, the gap angle $θ_p$ and the gap width $g_p$ of the new base metal Wa are smaller than those (θ, g) of the past base metal Wb.

Also, as shown in FIGS. 3A and 3B, in "multi-layer overlay welding" in this embodiment, the number of passes in arc welding is five passes and the number of layers is four layers.

First, it is assumed that, in the welding condition derivation device 1 (the welding robot 5) in this embodiment, the following welding conditions are stored as teach data in the database 2.

1) Number of passes: n (n=1, 2, . . . )
2) For each pass,
   Welding current I and welding voltage E as output commands to welding robot 5
   Target position P, target angle and advance angle, and speed v in welding of tip end of torch 7
   Parameters of weaving motion (sinusoidal wave): weaving amplitude W and weaving frequency F Also, in the welding condition derivation device 1 in this embodiment, it is assumed that a welding condition recognized as providing good welding quality in an actual welding test executed in advance (the welding condition of the past base metal Wb) is stored in advance in the database 2. Table 1 shows an example of welding conditions of the past base metal Wb.

TABLE 1

[Welding condition data of past base metal]

| | |
|---|---|
| Groove type: | V-type groove |
| Groove angle: | θ [RAD] |
| Bottom surface gap width: | g [mm] |
| Groove depth: | L [mm] |
| Number of layers: | 4 |
| Number of passes: | 5 |
| Conditions for each pass n: | Welding current $I_n$ |
| | Welding voltage $E_n$ |
| | Welding speed $v_n$ |
| | Target position $P_n$ |
| | Weaving amplitude $W_n$ |
| | Frequency $F_n$ [Hz] |

Also, as shown in Table 2, in the welding condition derivation device 1, the welding power source used in this embodiment, type of the welding wire 11 (for example, radius R), and characteristics determined by the performance limit of the welding robot 5 (for example, a feed speed $V_W(I)$ of the welding wire 11, a standard voltage value $E_S(I)$, a weaving frequency F, etc.) are stored in the database 2.

TABLE 2

[Input Conditions (specifications of welding machine)]

| | |
|---|---|
| Radius of welding wire | R [mm] |
| Upper and lower limit values for welding current I | $I_{min}$, $I_{max}$ [A] |
| Wire feed speed corresponding to welding current I | Vw(I) [mm/s] |
| Standard voltage value corresponding to welding current I | $E_s(I)$ [V] |
| Upper limit value of weaving frequency corresponding to weaving amplitude W | $F_{max}(W)$ [mm] |

Also, as shown in Table 3, as limit values for welding conditions for ensuring the welding quality in this embodiment, in the welding condition derivation device 1, the input heat quantity $Q_n$, the bead height $d_n$, the weaving conditions of the torch 7 (for example, a weaving amplitude $W_n$, a weaving pitch $dL_n$) of the past base metal Wb are also stored in the database 2.

TABLE 3

[Limit values for welding conditions]

| | |
|---|---|
| Input heat quantity $Q_n$ | Lower limit value $Q_{min}$ [J/mm], upper limit value $Q_{max}$ [J/mm] |
| | Allowable change threshold ΔQ [J/mm] at adjustment |
| Bead height (thickness) $d_n$ | Lower limit value $d_{min}$ [mm], upper limit value $d_{max}$ [mm] |

TABLE 3-continued

[Limit values for welding conditions]

| | |
|---|---|
| | Allowable change threshold Δd [mm] at adjustment |
| Weaving amplitude $W_n$ | Lower limit value $W_{min}$ [mm], upper limit value $W_{max}$ [mm] |
| Weaving pitch dL | Lower limit value $dL_{min}$ [mm], upper limit value $dL_{max}$ [mm] |
| | Allowable change threshold ΔdL [mm] at adjustment |

The above-described limit values of the welding conditions each are set within a range between a predetermined upper limit value and a predetermined lower limit value. For example, in the welding condition computation unit 3, when the input heat quantity $Q_{pn}$ to the new base metal Wa is taken into account, the input heat quantity $Q_{pn}$ to the new base metal Wa is set within a range between a predetermined upper limit value $Q_{max}$ and a predetermined lower limit value $Q_{min}$ on the basis of the input heat quantity $Q_n$ to the past base metal Wb.

Also, in the welding condition computation unit 3, when the bead height $d_{pn}$ of the deposition part formed at the new base metal Wa is taken into account, the bead height $d_{pn}$ of the new base metal Wa is set within a range between a predetermined upper limit value $d_{max}$ and a predetermined lower limit value $d_{min}$ on the basis of the bead height $d_n$ of the past base metal Wb.

Further, in the welding condition computation unit 3, when a weaving amplitude $W_{pn}$ for the new base metal Wa, serving as the weaving condition, is taken into account, the weaving amplitude $W_{pn}$ for the new base metal Wa is set within a range between a predetermined upper limit value $W_{max}$ and a predetermined lower limit value $W_{min}$ on the basis of the weaving amplitude $W_n$ for the past base metal Wb. Also, when a weaving pitch (=wavelength of weaving wave) $dL_{pn}$ is taken into account, the weaving pitch $dL_{pn}$ is set within a range between a predetermined upper limit value $dL_{max}$ and a predetermined lower limit value $dL_{min}$ on the basis of the weaving pitch $dL_n$ for the past base metal Wb.

In this embodiment, the setting of various data, storage of teach data, and setting of welding conditions of the new base metal Wa (the details will be described later) are executed on the database 2 by using the teaching pendant 9 provided to the welding robot 5.

Then, as shown in FIG. 3B, the operator inputs parameters (groove angles $θ_p$, gap width $g_p$) of the groove shape Za of the "new base metal Wa (new joint)" to be welded this time, and activates the welding condition computation unit 3 (automatic computation function for welding conditions).

The welding condition computation unit 3 executes processing steps (Step 1, Step 2) by a welding robot control CPU.

First, in Step 1, the bead shape and the input heat quantity are obtained from the welding conditions of the past base metal Wb.

To be specific, the cross-sectional shape parameter of the deposition part of each pass in a build-up diagram (see FIG. 4A) of beads formed under the welding conditions of the past base metal Wb, and the input heat quantity $Q_n$ to the deposition part of each pass are computed from [welding condition data of past base metal Wb] shown in Table 1 and [input conditions (specifications of welding robot 5)] shown in Table 2.

In this embodiment, the bead cross section of each pass has a "trapezoid" shape, and it is assumed that a bead width in an n-th pass (n=1, 2, . . . ) is $A_n$, a cross-sectional area of a bead (groove Zb) is $S_n$, a bead height is $d_n$, and an input heat quantity is $Q_n$.

As shown in FIG. 4A, the cross-sectional area $S_n$ [mm²], the bead width $A_n$ [mm] of the deposition part, the bead height $d_n$ [mm], and the input heat quantity $Q_n$ [J/mm] of the n-th pass are computed on the basis of the conditions of the n-th pass (in this embodiment, n=1 to 5) of the welding conditions of the past base metal Wb, that is, on the basis of a welding voltage $E_n$ [V], a welding current $I_n$ [A], a speed $v_n$ [mm/s], a target position $P_n$ of the torch 7, a weaving amplitude $W_n$ [mm], a weaving frequency $F_n$ [Hz], and so forth.

First, the welding conditions (n=1 to 3) of the past base metal Wb from first to third passes (n=1 to 3) are derived. The cross-sectional area (bead cross-sectional area) $S_n$ [mm²] of each of the deposition parts of the first to third passes is computed using Expression (2) as follows on the basis of the weld amount of the welding wire 11.

[Math 2]

$$S_n = V_W(I) \cdot \frac{\pi R^2}{v_n} \qquad (2)$$

In this expression, n=1 to 3.

Then, the bead height $d_n$ in each of the first to third passes is computed by converting Expression (3) into Expression (4).

[Math 3]

$$S_n = \left[A_{n-1} + d_n \cdot \tan\left(\frac{\theta}{2}\right)\right] \cdot d_n \qquad (3)$$

In this expression, n=1 to 3.

[Math 4]

$$d_n = \frac{-A_{n-1} + \sqrt{A_{n-1}^2 + 4 \cdot S_n \cdot \tan\left(\frac{\theta}{2}\right)}}{2 \cdot \tan\left(\frac{\theta}{2}\right)} \qquad (4)$$

In this expression, $A_0$=g (bottom surface length of first layer=gap length g [min]), and n=1 to 3.

Further, the bead widths $A_n$ [mm] in each of the first to third passes is computed by Expression (5) as follows.

[Math 5]

$$A_n = A_{n-1} + 2 \cdot d_n \cdot \tan\left(\frac{\theta}{2}\right) \qquad (5)$$

In this expression, n=1 to 3.

Then, the input heat quantities $Q_n$ [J/mm] in each of the first to third passes is computed by Expression (6) as follows.

[Math 6]

$$Q_n = \frac{I_n \cdot E_n}{v_n} \qquad (6)$$

In this expression, n=1 to 3.

Next, the welding conditions of the past base metal Wb in fourth and fifth passes (n=4 to 5) are derived. The bead cross-sectional area $S_n$ in each of the fourth and fifth passes is computed by Expression (7) as follows.

[Math 7]

$$S_n = V_W(I) \cdot \frac{\pi R^2}{v_n} \qquad (7)$$

In this expression, n=4, 5.

Then, the bead height $d_n$ in each of the fourth and fifth passes is computed by converting Expression (8) into Expression (9).

[Math 8]

$$S_n \left[A_3 + \frac{d_n \cdot \tan\left(\frac{\theta}{2}\right)}{2}\right] \cdot d_n \qquad (8)$$

In this expression, n=4, 5.

[Math 9]

$$d_n = \frac{-A_3 + \sqrt{A_3^2 + 2 \cdot S_n \cdot \tan\left(\frac{\theta}{2}\right)}}{\tan\left(\frac{\theta}{2}\right)} \qquad (9)$$

In this expression, n=4, 5.

Further, the bead width $A_n$ [mm] in each of the fourth and fifth passes is computed by Expression (10) as follows.

[Math 10]

$$A_n = \frac{A_3}{2} + d_n \cdot \tan\left(\frac{\theta}{2}\right) \qquad (10)$$

In this expression, n=4, 5.

Then, the input heat quantities $Q_n$ [J/mm] in each of the fourth and fifth passes is computed by Expression (11) as follows.

[Math 11]

$$Q_n = \frac{I_n \cdot E_n}{v_n} \qquad (11)$$

In this expression, n=4, 5.

In this embodiment, the bead cross-sectional area $S_n$, bead width $A_n$, bead height $d_n$, and input heat quantity $Q_n$ of the past base metal Wb are computed by calculation; however, the bead shape, actual current and voltage, etc., may be measured for each pass during actual welding test, and the measurement results may be stored as actual data of arc welding in the database 2.

Next, in Step 2, a parameter, such as the bead shape (cross-sectional area $S_{pn}$, the bead height $d_{pn}$, etc.) of the new base metal Wa (new weld joint), and the input heat quantity $Q_{pn}$ to the new base metal Wa are computed from the welding conditions of the past base metal Wb, and the welding conditions of the new base metal Wa are derived on the basis of the computed parameter of the bead shape and input heat quantity $Q_{pn}$ of the new base metal Wa.

As shown in FIGS. 4A and 4B, it is assumed that the groove angle of the new base metal Wa is $\theta_p$, the gap width of the new base metal Wa is $g_p$, the groove angle of the past base metal Wb is $\theta$, and the gap width of the past base metal Wb is g. Also, the groove angle satisfies ($\theta > \theta_p$) and the gap width g satisfies ($g > g_p$).

First, welding conditions for arc welding of a first layer (first pass) to the new base metal Wa are derived.

In this embodiment, the welding conditions of the new base metal Wa are derived so that the bead height (thickness) $d_{pn}$ is not changed from the welding condition of the past base metal Wb as possible, that is, the bead height is substantially similar to the welding condition of the past base metal Wb. This is because the inventors of this application figured out that the bead height $d_{pn}$ largely affects the welding quality as described in detail in "Technical Problem."

To be specific, a welding speed $v_{p1}$ is adjusted so that a bead height $d_{p1}$ of the first pass is aligned with a bead height $d_1$ of the first pass in the welding conditions of the past base metal Wb ($d_{p1}=d_1$). First, a bead cross-sectional area $S_{p1}$ [mm$^2$] of the first pass is computed by Expression (12) as follows.

[Math 12]

$$S_{p1} = d_{p1}^2 \cdot \tan\left(\frac{\theta_p}{2}\right) + d_{p1} \cdot g_p \tag{12}$$

Then, the new welding speed $v_{p1}$ is computed by Expression (13) as follows.

[Math 13]

$$v_{p1} = V_W(I) \cdot \frac{\pi R^2}{S_{p1}} \tag{13}$$

In this embodiment, since the groove shape Za of the new base metal Wa is narrower than the groove shape Zb of the past base metal Wb, the welding speed $v_{p1}$ of the new base metal Wa is lower than a welding speed $v_1$ of the past base metal Wb ($v_{p1} < v_1$). Also, an input heat quantity $Q_{p1}$ to the new base metal Wa is increased as compared with an input heat quantity $Q_1$ to the past base metal Wb ($Q_{p1} > Q_1$).

When the input heat quantity $Q_{p1}$ to the new base metal Wa is computed, the computed input heat quantity $Q_{p1}$ to the new base metal Wa is adjusted to fall within a predetermined range.

Respective thresholds used at this time use [limit values of welding conditions] shown in Table 3.

Input heat quantity Q
Lower limit value $Q_{min}$ [J/mm], upper limit value $Q_{max}$ [J/mm]
Allowable change threshold $\Delta Q$ [J/mm] at adjustment Bead height d
Lower limit value $d_{min}$ [mm], upper limit value $d_{max}$ [mm]
Allowable change threshold $\Delta d$ [mm] at adjustment It is to be noted that these upper and lower limit values are design values obtained in advance or computed as know-how in welding procedure.

If the input heat quantity $Q_{p1}$ to the new base metal Wa exceeds the upper limit $Q_{max}$ ($Q_{p1} > Q_{max}$), or the difference between the input heat quantity $Q_{p1}$ to the new base metal Wa and the input heat quantity $Q_1$ to the past base metal Wb exceeds the allowable change threshold $\Delta Q$ at adjustment ($Q_{p1} - Q_1 > \Delta Q$), the input heat quantity $Q_{p1}$ to the new base metal Wa is computed so that the input heat quantity $Q_{p1}$ to the new base metal Wa becomes the upper limit value $Q_{max}$ or the input heat quantity $Q_{p1}$ to the new base metal Wa becomes a value in which the allowable change threshold $\Delta Q$ at adjustment is added to the input heat quantity $Q_1$ to the past base metal Wb ($Q_1 + \Delta Q$) by Expression (14) as follows, and a welding current $I_{p1}$ is computed by Expression (15) as follows.

[Math 14]

$$Q_{p1} = \frac{(I_1 \cdot E_1)}{v_{p1}} \tag{14}$$

[Math 15]

$$I_{p1} = \frac{Q_{max} \cdot v_{p1}}{E_n} \tag{15}$$

The welding current $I_{p1}$ is adjusted on the basis of the computed input heat quantity $Q_{p1}$ to the new base metal Wa (in this embodiment, the welding current $I_{p1}$ is decreased). As the result, the deposition quantity to the new base metal Wa is changed, and hence the bead height $d_{p1}$ of the new base metal Wa is changed.

The bead height $d_{p1}$ of the new base metal Wa is computed by Expression (16) and Expression (17) as follows.

[Math 16]

$$S_{p1} = V_W(I) \cdot \frac{\pi R^2}{v_{p1}} \tag{16}$$

[Math 17]

$$d_{p1} = \frac{-A_{p0} + \sqrt{A_{p0}^2 + 4 \cdot S_{p1} \cdot \tan\left(\frac{\theta_p}{2}\right)}}{2 \cdot \tan\left(\frac{\theta}{2}\right)} \tag{17}$$

In this embodiment, it is checked whether or not the absolute value of the difference between the computed bead height $d_{p1}$ of the new base metal Wa and the bead height $d_1$ of the welding condition of the past base metal Wb is the allowable change threshold $\Delta d$ at adjustment or smaller, that is, satisfies Expression (18) as follows.

[Math 18]

$$|d_1 - d_{p1}| \leq \Delta d \qquad (18)$$

For example, as shown in Expression (19), if the absolute value of the difference between the computed bead height $d_{p1}$ of the new base metal Wa and the bead height $d_1$ in the welding conditions of the past base metal Wb is the allowable change threshold $\Delta d$ at adjustment or larger, that is, does not satisfy Expression (18), it means that the bead height $d_{p1}$ is largely changed. In this way, if the bead height $d_{p1}$ is largely changed (becomes the threshold or larger), the situation may be notified to the operator through the teaching pendant 9.

[Math 19]

$$|d_{p1} - d_{p1}| > \Delta d \qquad (19)$$

A bead width $A_{p1}$ of the first layer is computed by Expression (20) as follows by using the welding current $I_{p1}$ computed as described above.

[Math 20]

$$A_{p1} = A_{p0} + 2 \cdot d_{p0} \cdot \tan\left(\frac{\theta_p}{2}\right) \qquad (20)$$

The computed bead width $A_{p1}$ of the first layer is used for deriving the welding conditions of the second pass (second layer).

Thereafter, the above-described derivation of the welding condition of the new base metal Wa is executed repeatedly to the last layer (fifth pass in the fourth layer).

In particular, at the fourth pass and fifth pass in the fourth layer, a bead height $d_{p4}$ ($=d_{p5}$) is set by Expression (21) as follows, so that the final bead fills the entire region of the groove Za.

[Math 21]

$$d_{p4} = L - (d_{p1} + d_{p2} + d_{p3}) \qquad (21)$$

A bead cross-sectional area $S_{p4}$ is calculated by Expression (22) as follows.

[Math 22]

$$S_{p4} = \left(A_{p3} + \frac{d_{p4} \cdot \tan\left(\frac{\theta_p}{2}\right)}{2}\right) \cdot d_{p4} \qquad (22)$$

Then, a welding speed $V_{p4}$ is computed by Expression (23) using the computed bead cross-sectional area $S_{p4}$. Then, a welding current $I_{p4}$ is calculated by Expression (24) using the computed welding speed $v_{p4}$.

[Math 23]

$$v_{p4} = V_W(I) \cdot \frac{\pi R^2}{S_{p4}} \qquad (23)$$

[Math 24]

$$I_{p4} = \frac{Q_{max} \cdot v_{p4}}{E_4} \qquad (24)$$

The operator references the welding conditions of the new base metal Wa, which are derived by the welding condition derivation device 1 of the present invention as described above and displayed on the teaching pendant 9, and sets the welding conditions of the new base metal Wa.

As described above, the welding conditions of the new base metal Wa without a welded record in the past can be derived with sufficiently satisfied information relating to arc welding, by taking into account the cross-sectional area $S_{pn}$ of the deposition part formed at the new base metal Wa, and by taking into account at least one of the bead height $d_{pn}$ of the deposition part formed at the new base metal Wa, the input heat quantity $Q_{pn}$ to the new base metal Wa, and the weaving condition of the torch 7 (the weaving amplitude $W_{pn}$, weaving pitch $dL_{pn}$, etc.), on the basis of the "welding condition data" of the past base metal Wb similar to the new base metal Wa and the "input data" relating to the specifications of the welding robot 5. Also, the welding condition derivation device 1 of the present invention automatically adjusts the welding conditions of the new base metal Wa to make the change in the input heat quantity $Q_n$ with respect to the welding condition having a welded record in the past fall within a proper range with the highest priority, and hence can prevent a welding defect, such as incomplete fusion, degradation in mechanical characteristics, etc., due to insufficiency or excess of the input heat quantity $Q_{pn}$.

Also, the welding condition derivation device 1 of the present invention can prevent insufficiency in "penetration" by using the above-described derivation process of the welding conditions of the new base metal Wa, in particular, by making the bead height $d_{pn}$ fall within the predetermined range ($d_{max}$ to $d_{min}$), or by not changing the bead height $d_{pn}$ form $d_n$ as possible.

Also, the welding condition derivation device 1 of the present invention can widen the adjustable range when the welding conditions of the new base metal Wa are derived, and can handle new base metals Wa of various groove shapes Za and Zb by adding the feed speed $V_W(I)$ of the welding wire 11 (=welding current I) as the object to be adjusted in addition to the welding speed $v_p$.

Also, as described above, since the adjustable range when the welding conditions of the new base metal Wa are derived is a wide range, the welding conditions of the past base metal Wb required to be stored in the database 2 in advance can be minimized. Therefore, the number of times of the actual welding test that derives the welding conditions of the past base metal Wb to be stored in the database 2 in advance can be decreased.

Also, since the welding conditions of the new base metal Wa are derived by taking into account not only "limit values" in welding procedure of the characteristic and performance limit (the input heat quantity $Q_p$, the bead height $d_p$) of the welding robot 5 used for arc welding, but also limit values of the welding robot 5 (the upper limit value of the wire feed speed $V_W(I)$, the limit of the welding speed v of the welding robot 5, the upper limit value of the weaving amplitude W for each weaving frequency F), and hence the computed welding conditions of the new base metal can be reliably executed in the welding robot 5. Therefore, a preparatory check operation of the welding robot 5 is not required after the welding conditions are changed.

The embodiment disclosed at this time is merely an example in all points of view, and is not limited thereto.

For example, described in this embodiment is that the operator executes the setting operation for the welding conditions of the new base metal Wa by using the teaching pendant 9 on the basis of the welding conditions of the new base metal Wa derived by the welding condition derivation device 1. However, it is not limited thereto. The welding conditions of the new base metal Wa derived by the welding condition derivation device 1 may be displayed on a display unit (monitor) such as the personal computer 10, and the welding conditions of the new base metal Wa may be set by using an input device, such as a keyboard or a mouse.

Also, in this embodiment, the articulated welding robot 5 that causes the torch 7 to make the weaving motion is described as an example of a welding machine that automatically executes arc welding. However, this articulated welding robot 5 is merely an example, and the welding machine is not particularly limited as long as the welding machine can make the weaving motion capable of automatic welding. For example, a simple automatic welding machine of linear movement type having a weaving function may be employed. Also, in this embodiment, the "multi-layer overlay welding" in which the plurality of welding beads are overlaid at the object joint is described as an example of a method of arc welding. However, the present invention may be applied to "one-layer one-pass welding." Also, the present invention may be applied to "fillet weld joint welding."

In particular, in the embodiment disclosed at this time, matters not explicitly disclosed, for example, a running condition, an operating condition, various parameters, dimensions, weights, volumes, etc., of components, and so force employ values that are within a range generally employed by those skilled in the art and that can be easily expected by those skilled in the art.

This application is based on Japanese Patent Application (Japanese Patent Application No. 2014-115700) filed Jun. 4, 2014, which is hereby incorporated by reference herein in its entirety.

REFERENCE SIGNS LIST 1 welding condition derivation device
2 database
3 welding condition computation unit
7 torch
11 welding wire (welding electrode)
Wa new base metal (object workpiece)
Wb past base metal
Za groove of new base metal (groove shape)
Zb groove of past base metal (groove shape)

The invention claimed is:

1. A welding condition derivation device provided to a welding machine having an input device, that automatically executes arc welding by using a torch having a weaving mechanism, and configured to automatically derive a welding condition corresponding to a cross-sectional shape of a deposition part of a current base metal to be welded, comprising:
 a database that stores data of past welding conditions; and
 a welding condition computation unit that computes a welding condition in accordance with a shape of a groove of the current base metal, the shape of the groove of the current base metal being measured and input to the input device by an operator;
 wherein the welding condition computation unit,
 on the basis of welding condition data of a past base metal having a shape of the groove similar to the shape of the groove of the current base metal, whose data is obtained from the input of the input device, and input data relating to specifications of the welding machine, similarity between the shape of the groove of the past base metal and the shape of the groove of the current base metal is determined by the operator,
 derives welding condition data of the current base metal by taking into account a parameter of a cross-sectional area of the deposition part formed at the current base metal, and at least one of parameters including a bead height of the deposition part formed at the new base metal, an input heat quantity to the current base metal, and a weaving condition of the torch,
 wherein the parameter of the cross-sectional area of the deposition part formed at the current base metal is measured and input to the input device by the operator,
 the welding condition computation unit sets the bead height, the input heat quantity, and the weaving condition of the torch, and
 the welding condition computation unit sets the bead height of the current base metal within a predetermined range with respect to the bead height of the past base metal having the shape similar to the current base metal.

2. The welding condition derivation device according to claim 1, wherein the welding condition computation unit sets the input heat quantity to the current base metal within a range between a predetermined upper limit value and a predetermined lower limit value.

3. The welding condition derivation device according to claim 1, wherein the welding condition computation unit sets a weaving amplitude for the current base metal and a weaving pitch being a wavelength of a weaving wave, each serving as the weaving condition, to be respectively within ranges between predetermined upper limit values and predetermined lower limit values.

4. The welding condition derivation device according to claim 2, wherein the welding condition computation unit sets a weaving amplitude for the current base metal and a weaving pitch being a wavelength of a weaving wave, each serving as the weaving condition, to be respectively within ranges between predetermined upper limit values and predetermined lower limit values.

5. The welding condition derivation device according to claim 1,
 wherein the welding condition computation unit extracts a bead height of the past base metal from the welding condition data of the past base metal, sets the extracted bead height of the past base metal as a bead height of the current base metal,
 then computes a cross-sectional area of a deposition part of the past base metal, and derives a welding speed serving as one piece of the welding condition data of the current base metal by using the computed cross-sectional area of the deposition part of the past base metal.

6. The welding condition derivation device according to claim 5,
 wherein the welding condition computation unit
 computes an input heat quantity to the current base metal by using the derived welding speed, and
 derives a welding current serving as one piece of the welding condition data of the current base metal by using the computed input heat quantity to the past base metal.

7. The welding condition derivation device according to claim 1,
 wherein the welding condition computation unit
 extracts a weaving amplitude for the past base metal and a bead width at the past base metal from the welding condition data of the past base metal, and adds a difference between the bead width at the past base metal and a bead width at the current base metal to the weaving amplitude for the past base metal and sets the result as a weaving amplitude serving as one piece of the welding condition data of the current base metal.

8. The welding condition derivation device according to claim 3,
wherein the welding condition computation unit
extracts a weaving amplitude for the past base metal and a bead width at the past base metal from the welding condition data of the past base metal, and
adds a difference between the bead width at the past base metal and a bead width at the current base metal to the weaving amplitude for the past base metal and sets the result as a weaving amplitude serving as one piece of the welding condition data of the current base metal.

9. The welding condition derivation device according to claim 5, wherein the welding condition computation unit derives a weaving pitch serving as one piece of the welding condition data of the current base metal by adjusting a weaving frequency to fall within a range between a predetermined upper limit value and a predetermined lower limit value of the weaving pitch on the basis of the computed welding speed.

10. The welding condition derivation device according to claim 1, wherein the welding condition computation unit re-calculates the upper limit value and the lower limit value of each piece of the set welding condition data of the current base metal by using the input data relating to the specifications of the welding machine.

11. The welding condition derivation device according to claim 2, wherein the welding condition computation unit re-calculates the upper limit value and the lower limit value of each piece of the set welding condition data of the current base metal by using the input data relating to the specifications of the welding machine.

12. The welding condition derivation device according to claim 3, wherein the welding condition computation unit re-calculates the upper limit value and the lower limit value of each piece of the set welding condition data of the current base metal by using the input data relating to the specifications of the welding machine.

13. The welding condition derivation device according to claim 5, wherein the welding condition computation unit re-calculates the upper limit value and the lower limit value of each piece of the set welding condition data of the current base metal by using the input data relating to the specifications of the welding machine.

14. The welding condition derivation device according to claim 4, wherein the welding condition computation unit re-calculates the upper limit value and the lower limit value of each piece of the set welding condition data of the current base metal by using the input data relating to the specifications of the welding machine.

15. The welding condition derivation device according to claim 6, wherein the welding condition computation unit re-calculates the upper limit value and the lower limit value of each piece of the set welding condition data of the current base metal by using the input data relating to the specifications of the welding machine.

16. The welding condition derivation device according to claim 7, wherein the welding condition computation unit re-calculates the upper limit value and the lower limit value of each piece of the set welding condition data of the current base metal by using the input data relating to the specifications of the welding machine.

17. The welding condition derivation device according to claim 8, wherein the welding condition computation unit re-calculates the upper limit value and the lower limit value of each piece of the set welding condition data of the current base metal by using the input data relating to the specifications of the welding machine.

18. The welding condition derivation device according to claim 9, wherein the welding condition computation unit re-calculates the upper limit value and the lower limit value of each piece of the set welding condition data of the current base metal by using the input data relating to the specifications of the welding machine.

19. A welding condition derivation device provided to a welding machine, having an input device, that automatically executes arc welding by using a torch having a weaving mechanism, and configured to automatically derive a welding condition corresponding to a cross-sectional shape of a deposition part of a current base metal to be welded, comprising:
a database that stores data of past welding conditions; and
a welding condition computation unit that computes a welding condition in accordance with a shape of a V-type groove of the current base metal, the shape of the V-type groove of the current base metal being measured and input to the input device by an operator;
wherein the welding condition computation unit,
on the basis of welding condition data of a past base metal having a shape of the V-type groove similar to the shape of the V-type groove of the current base metal, whose data is obtained from the input of the input device, and input data relating to specifications of the welding machine, similarity between the shape of the V-type groove of the past base metal and the shape of the V-type groove of the current base metal is determined by the operator based on a groove angle, a bottom surface gap and a groove depth,
derives welding condition data of the current base metal by taking into account a parameter of a cross-sectional area of the deposition part formed at the current base metal, and at least one of parameters including a bead height of the deposition part formed at the new base metal, an input heat quantity to the current base metal, and a weaving condition of the torch,
wherein the parameter of the cross-sectional area of the deposition part formed at the current base metal is measured and input to the input device by the operator,
the welding condition computation unit sets the bead height, the input heat quantity, and the weaving condition of the torch, and
the welding condition computation unit sets the bead height of the current base metal within a predetermined range with respect to the bead height of the past base metal having the shape similar to the current base metal.

* * * * *